(12) United States Patent
Hopper

(10) Patent No.: US 12,049,165 B2
(45) Date of Patent: Jul. 30, 2024

(54) REFLECTIVE TIE DOWN STRAP

(71) Applicant: MULTIPRENS USA, INC., Kansas City, MO (US)

(72) Inventor: Roy James Hopper, Lewisville, TX (US)

(73) Assignee: MULTIPRENS USA, INC., Kansas City, KS (US)

( * ) Notice: Subject to any disclaimer, the term of this patent is extended or adjusted under 35 U.S.C. 154(b) by 27 days.

(21) Appl. No.: 17/812,921

(22) Filed: Jul. 15, 2022

(65) Prior Publication Data

US 2023/0017898 A1     Jan. 19, 2023

Related U.S. Application Data

(60) Provisional application No. 63/222,779, filed on Jul. 16, 2021.

(51) Int. Cl.
*B60P 7/00*         (2006.01)
*B60P 7/08*         (2006.01)

(52) U.S. Cl.
CPC .................... *B60P 7/083* (2013.01)

(58) Field of Classification Search
CPC .......... B60P 7/083; B60P 7/0823; B66D 1/30; B66D 1/54; B66D 1/60
See application file for complete search history.

(56) References Cited

U.S. PATENT DOCUMENTS

| | | | |
|---|---|---|---|
| 4,187,332 | A | 2/1980 | Fouche, Jr. |
| 6,863,482 | B2 | 3/2005 | Lockhart et al. |
| 8,370,997 | B2 | 2/2013 | Wright |
| 10,703,251 | B1* | 7/2020 | Jones ............... B63B 25/22 |
| 2003/0057409 | A1* | 3/2003 | Grapes ............. B66D 1/54 |
| | | | 254/342 |
| 2006/0285938 | A1* | 12/2006 | Early ............... B60P 7/0869 |
| | | | 410/96 |
| 2010/0202142 | A1 | 8/2010 | Morgan |
| 2010/0202143 | A1 | 8/2010 | Ruehlemann et al. |
| 2015/0074953 | A1* | 3/2015 | Dershem ........ A63B 21/0557 |
| | | | 24/301 |
| 2015/0128388 | A1* | 5/2015 | Mastbeth ......... B60P 7/0853 |
| | | | 24/68 CD |
| 2016/0009215 | A1* | 1/2016 | Wu ................ B60P 7/0823 |
| | | | 156/247 |
| 2021/0317602 | A1 | 10/2021 | Wang |

FOREIGN PATENT DOCUMENTS

| | | | |
|---|---|---|---|
| AU | 2019100263 A4 * | 4/2019 | |
| CN | 206928006 | 1/2018 | |
| DE | 102004001265 B4 * | 5/2007 | ......... B60P 7/0823 |

OTHER PUBLICATIONS

Matos, T., International Search Report for International Patent Application No. PCT/US2022/073802, dated Sep. 7, 2022, United States Patent Office.

Matos, T., International Written Opinion for International Patent Application No. PCT/US2022/073802, dated Sep. 7, 2022, United States Patent Office.

* cited by examiner

*Primary Examiner* — Emmanuel M Marcelo
(74) *Attorney, Agent, or Firm* — Spencer Fane, LLP

(57) ABSTRACT

A tie down strap for securing cargo to a flatbed trailer includes a visibility enhancement material formed at the edges, such as reflective material. The strap is used with a ratchet mechanism to secure cargo to a trailer.

1 Claim, 4 Drawing Sheets

REFLECTIVE TIE DOWN STRAP

CROSS-REFERENCE TO RELATED APPLICATIONS

This application claims priority in U.S. Patent Application Ser. No. 63/222,779, filed Jul. 16, 2021, the contents of which are hereby incorporated by reference.

BACKGROUND

1. Field of the Disclosed Subject Matter

Tie down straps for securing objects.

2. Background

Straps are used to secure objects to one another, or secure objects to a surface. Cargo transportation uses straps with a winch or binding mechanisms, also known as tie down strap assemblies, to secure objects to transportation surfaces. Such straps used on trailers, are often visible to motorists.

SUMMARY

A tie down strap for securing cargo to a flatbed trailer includes a visibility enhancement material formed at the edges, such as reflective tape attached by stitching. The strap is used with any one of several traditional hardware assemblies used for securing cargo, such as a ratchet mechanisms, or a cam buckle. The visibility enhancement material is reflected by automobiles at night enhancing the visibility of the trailer to motorists.

These and other features, aspects, and advantages of the present disclosed subject matter will become more understood with reference to the following description and appended claims.

BRIEF DESCRIPTION OF THE DRAWINGS

The present disclosed subject matter is described herein with reference to the following drawing figures, with greater emphasis being placed on clarity rather than scale.

DETAILED DESCRIPTION

Figure 1:
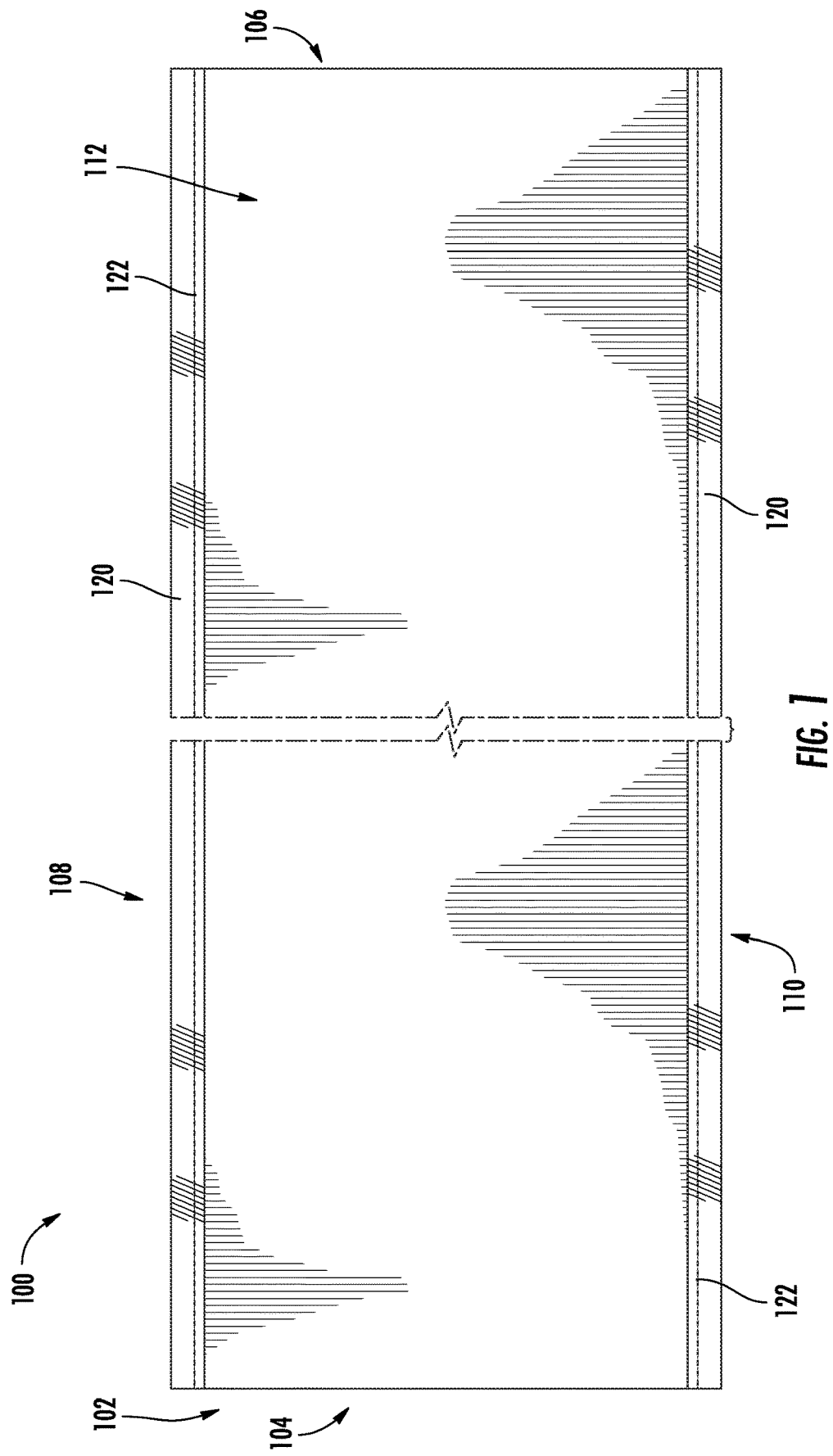
FIG. 1 is a plan view of a first side of a segment of the reflective tie down strap embodying aspects of the disclosed subject matter.
Figure 2:
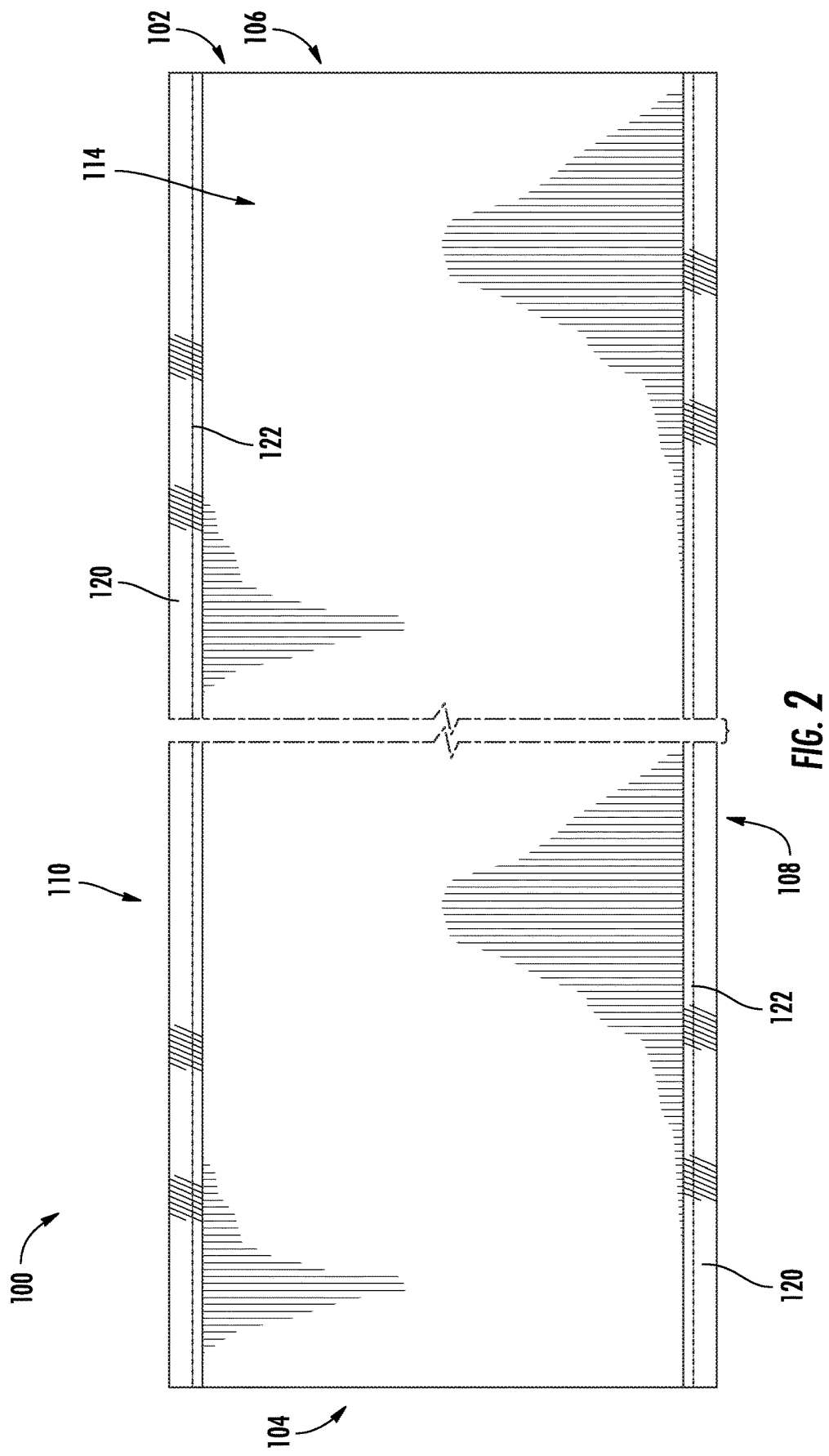
FIG. 2 is a plan view of a second side of a segment of the reflective tie down strap embodying aspects of the disclosed subject matter.
Figure 3:
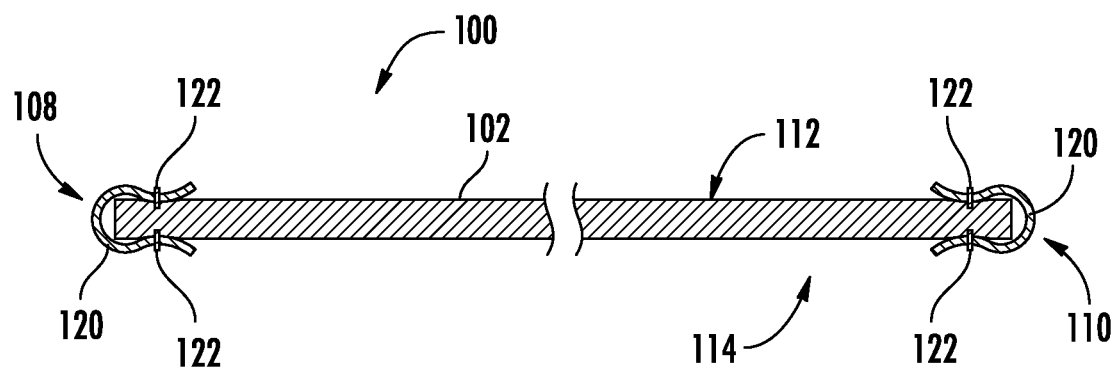
FIG. 3 is a cross-section of the reflective tie down strap embodying aspects of the disclosed subject matter.

Referring to FIGS. 1-3, an embodiment of a reflective tie down strap 100 is shown and described. The strap 100 shown in FIGS. 1-2 is a segment of a strap 100 having a visibility enhancement treatment used with a securing device, such as a winch or a ratchet 138, or a locking mechanism, such as a buckle, to tie down or secure an object to a transportation surface. The strap 100 can be used as a strap with a typical ratchet mechanism for securing objects, to a transport trailer, such as the ratchet mechanism shown and described in U.S. Pat. No. 8,370,997, which is incorporated herein by reference in its entirety.

Figure 4:
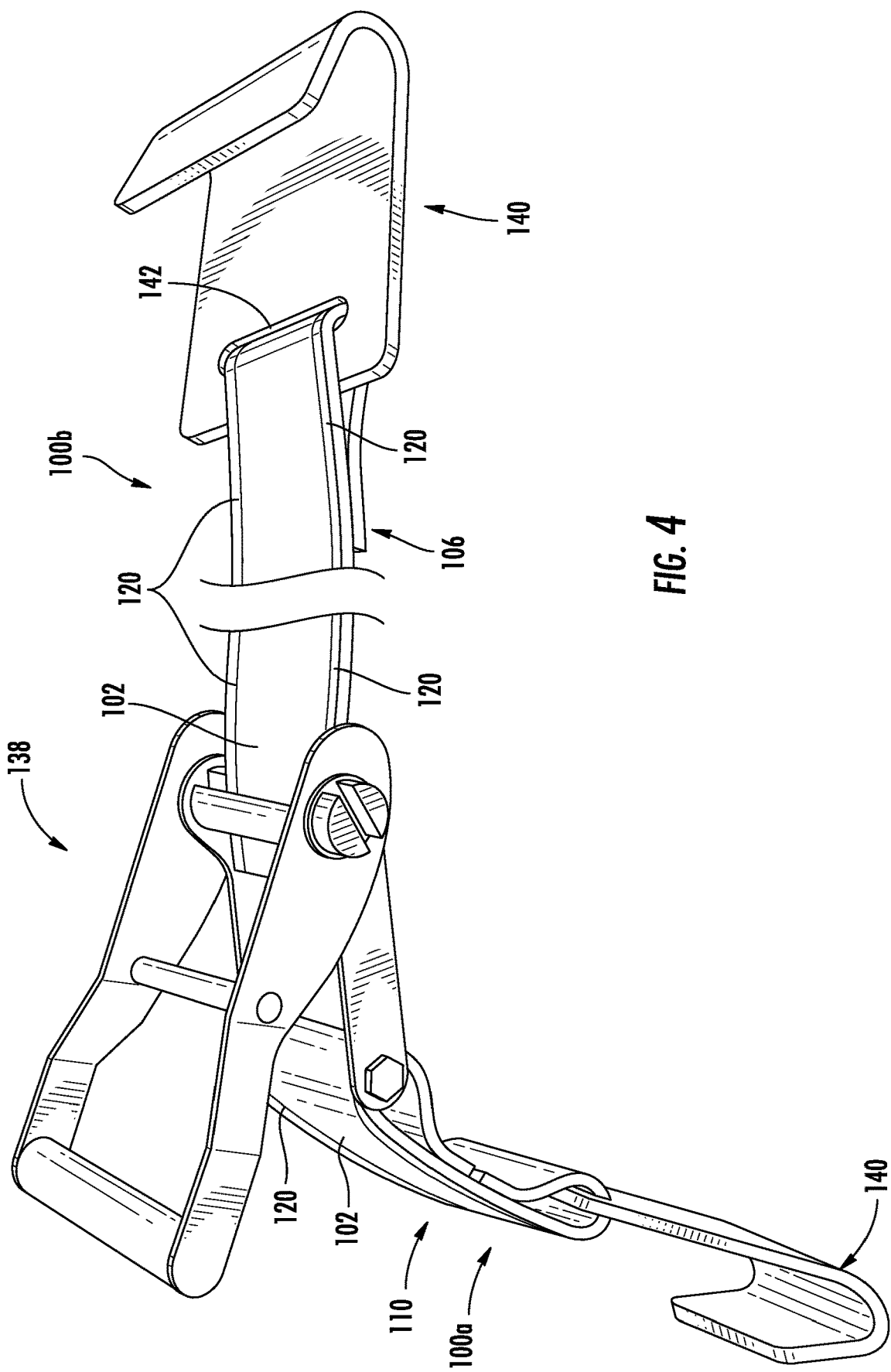
FIG. 4 is a perspective view of the reflective tie down strap embodying aspects of the disclosed subject matter in use with a ratchet and flat hook attachment apparatus.

In an embodiment, the strap 100 forms a flat, flexible body 102 forming a length that extends from a first end 104 to a second end 106, where the first end is a free end operably connected to the ratchet mechanism, and the second end optionally includes an attachment apparatus 140, such as the flat hook shown in FIG. 4. The body 102 forms a width extending between a first edge 108 and second edge 110, where the width is generally between about 2 inches, and about 4 inches. The first edge 108 and second edge 110 extend the length of the body 102 between the first end 104 and second end 106. The height of the edges 108, 110 is formed by the thickness of the body 102, defined by the distance between the top surface 112 and bottom surface 114. The body 102 is formed from a polyester or nylon web woven in various lengths, widths, thickness, and colors.

The attachment apparatus 140 can be attached to the second end as in known in the art, such as by passing the strap 100 through an opening 142 formed by the attachment apparatus 140 and stitching or sewing the second end 106 of the strap 100 that has passed through the opening 142 to the body 102 adjacent the second end 106 of the strap 100. The attachment apparatus 140 is connected to a trailer attachment point. The attachment apparatus 140 can be a hook member, ring member, or other fitting. Hook members include flat hooks, wire hooks, and S-hooks. Ring members include round rings, pear rings, D-rings, belt rings, and triangular or delta rings. Other fittings include loops formed by the strap 100, chain anchors, and bolt plates.

The first edge 108 and second edge 110 include a visibility enhancement treatment at each edge. In an implementation, the visibility enhancement treatment is reflective material that reflects light, such as the reflective material 120 of FIGS. 1-4. In an implementation, the reflective material 120 includes a reflective yarn, ribbon, tape, or fabric material of various lengths, width, and color. In an implementation the reflective material 120 is a continuous strip of material that is wrapped or formed around each of the edges 108, 110 of the strap 100 beginning on the top surface 112, extending around the edge to the bottom surface 114 of the strap 100, and extend between the first end 104 and the second end 106. The reflective material 120 is formed from a polymer that has minute glass beads distributed within the polymer. These glass beads, when exposed to light, reflect light back to its source. As shown in FIGS. 1-2, the reflective material 120 is attached to the body 102 by an adhesive material, and alternatively by stitching 122 or sewing, such as thread extending through the reflective material 120 into the body 102, with the strap 100 between the reflective material 120.

In an implementation, the reflective material 120 is a continuous strip of reflective tape adhered to the strap 100 top surface 112, strap edges 108, 110, and strap bottom surface 114. In an implementation, the reflective material 120 is applied to the strap 100 by vapor coating. In an implementation, the reflective material 120 comprises a reflective fiber that is connected to or woven into the strap 100. In one or more embodiments, the visibility enhancement treatment can be formed from a structurally continuous piece of material, separately fabricated and connected, or as intermittent elements along the edges 108, 110.

In use, the strap 100 is used to secure cargo, such as cargo on a trailer or a flatbed trailer connected to a tractor, with the visibility enhancement increasing the visibility of the trailer at night. The strap 100 is used in conjunction with a securing device to secure an object to the trailer. The first end of the strap 100 is operably connected to, or formed integral to the securing deice. For example, a first end of a first strap 100*a* is securely connected to a securing device, and a first end of a second strap 100*b* is releasably connected to the securing device. By way of example, as shown in FIG. 4, a first strap 100*a*, is securely connected to a ratchet 138 at the left side of the image, and a second strap 100*b* is releasably connected to the ratchet 138 by passing the first end 104 of the body 102 through mandrel. The attachment apparatuses 140, here represented by flat hooks, are connected to an attachment point on the trailer, and the mandrel is rotatably ratcheted by the handle member to draw the second strap 100 tight about an object when in use.

The reflective material 120 reflects light at night when illuminated by a light source, such as by vehicle headlights directed at the reflective material 120. The reflective material 120 increases the nighttime visibility of the trailer and helps to alert approaching motorists as to the presence of the trailer, whether it is moving, parked, or the trailer marking lights are unpowered. For an unpowered trailer at night, the reflective tie down strap 100 will alert motorists of its presence, possible preventing an accident or loss of life.

Having described the disclosed subject matter, what is claimed as new and desired to be secured by Letters Patent is:

1. A tie down strap, comprising:
   a body, wherein the body has a length extending between a first end and a second end, wherein the body has a width extending between a first edge and a second edge, and wherein the first edge and second edge extend the length of the body;
   a reflective material at each of the first edge and the second edge, the reflective material extending between the first end and the second end;
   wherein the reflective material includes glass, and is sewn to the body;
   a ratchet with a rotating mandrel, wherein the strap first end is releasably connected to the mandrel; and
   an attachment apparatus connected to the strap second end.

\* \* \* \* \*